Oct. 9, 1928.
H. M. STOLLER
1,687,233
DYNAMO ELECTRIC MACHINE
Filed June 8, 1923    2 Sheets-Sheet 1
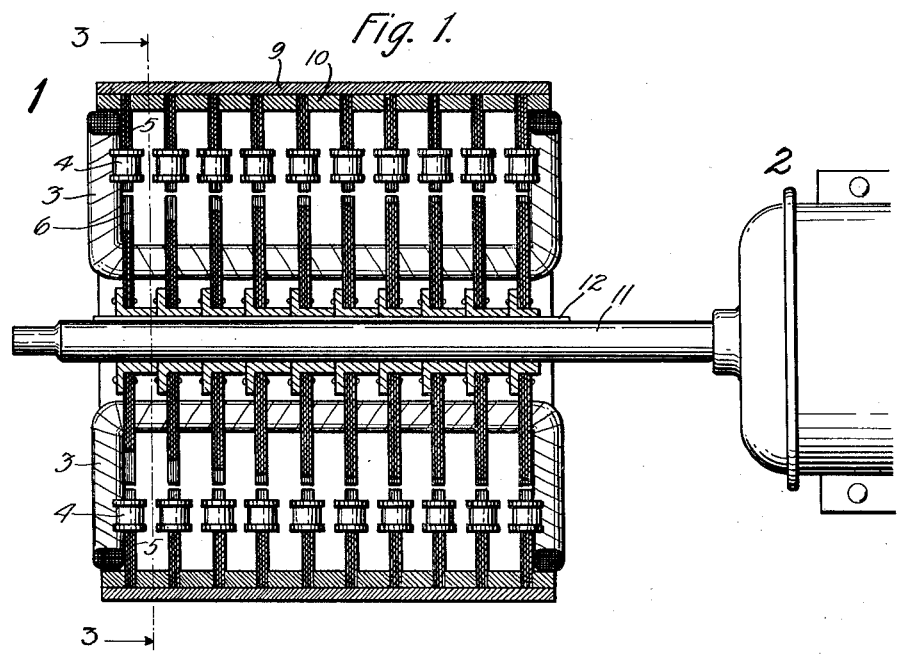
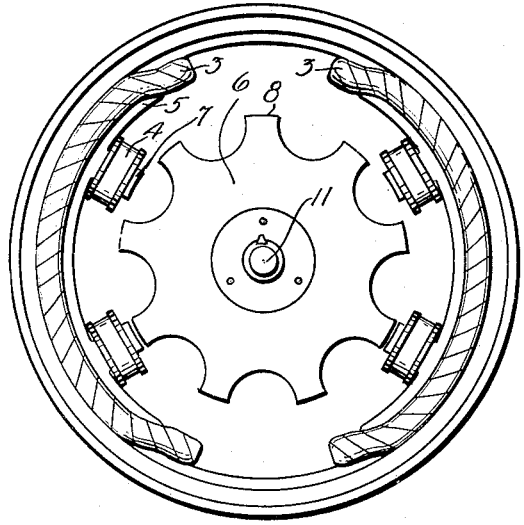
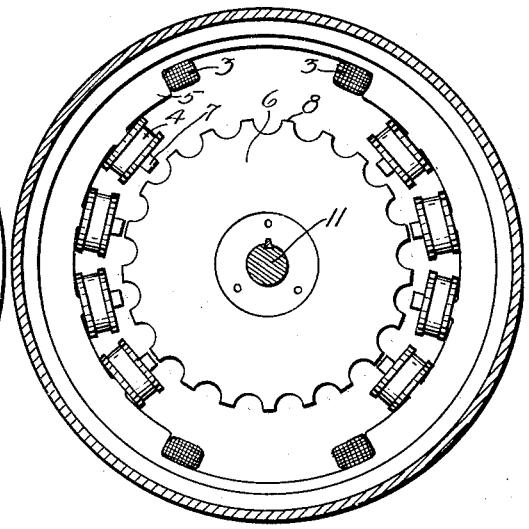
Inventor:
Hugh M. Stoller
by E.W. Griggs    Atty Oct. 9, 1928.

H. M. STOLLER 1,687,233

DYNAMO ELECTRIC MACHINE

Filed June 8, 1923  2 Sheets-Sheet 2

Inventor:
Hugh M. Stoller
by E. W. Griggs  Atty

Patented Oct. 9, 1928.

1,687,233

UNITED STATES PATENT OFFICE.

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

DYNAMO-ELECTRIC MACHINE.

Application filed June 8, 1923. Serial No. 644,071.

This invention relates to dynamo electric machines and particularly to such machines adapted for the simultaneous generation of a plurality of currents of different frequencies.

The invention has for an object to provide an improved alternator of the inductor type.

A more specific object of the invention is to provide a multi-current generator characterized by unusual simplicity of circuit and mechanical detail, relatively low cost of manufacture, and high efficiency and reliability of operation.

Special features of the invention, comprehended in the general statement above are: an assembly of functionally independent inductor generator units having their inductor elements unitarily mounted on a common rotating member; a combination of such generator units in which a common magnetic field structure is used; and a particular relative proportion of the flux carrying armature and inductor parts of each unit which insures an unusually pure sine wave form of the generated current or alternatively provides for the production of a current having either of two desired frequencies depending on the mode of connection of the armature windings. An additional feature, also depending on the particular design of the flux carrying parts, is the avoidance thereby of mutual induction effects between the circuits of the respective generator units.

The inductor generator unit of the invention is similar to other generators of the inductor type in that it employs elements as follows:

A stationary laminated iron core which carries the armature windings in which is induced alternating current.

A winding for producing a unidirectional flux which threads the armature windings.

A toothed rotor or inductor of magnetic material which completes the magnetic circuit for the flux and which, by its rotation, provides a path of variable reluctance therefor.

According to the present invention, however, a novel arrangement of the flux producing windings is effected whereby the above stated objects are realized.

In the arrangement of this invention the field windings of the type employed in conventional direct current machines are related to the inductors in the manner above described. In this arrangement, the flux threads through the inductors from one exciting coil to an exciting coil diametrically opposite in a direction normal to the axis, the direction of flux through each tooth of the inductor accordingly changing as that tooth passes from one exciting pole to another. Such an arrangement readily permits the use of a single set of exciting windings for a plurality of sets of armature and inductor elements so that the magnetic circuit for each set is substantially independent functionally.

In one example of multi-frequency generator of the invention the ratio of armature tooth pitch to inductor tooth pitch of the generator unit is 3 to 2 for the inductors having the smaller number of teeth; and in the case of the inductor having the larger number of teeth is 5 to 2. In general the ratio must be $N/2$ in which $N$ is an odd number. Thus when an armature tooth opposes an inductor tooth, the adjacent armature tooth on each side is opposed to an inductor slot. As will more fully hereinafter appear, advantages of such a ratio are:

Higher frequency currents are produced.

A very pure sine wave form is assured.

Either of two desired frequencies may be produced depending on the connection of the armature windings.

Inductive effects between the several generator units are avoided.

The invention will be described as applied to a multi-frequency generator, although it will be understood that it may be applied to other forms of generators and in other relations.

In the drawings:

Fig. 1 shows the essential parts of the multiple frequency generator partly in axial section.

Fig. 2 is an end elevation of the multiple frequency generator showing an end generator unit.

Fig. 3 is a vertical section on line 3—3 of Fig. 1 showing an intermediate generator unit.

Figure 4:
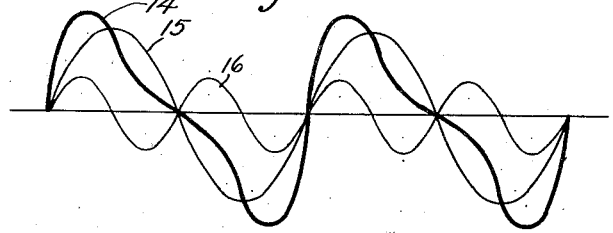
Figs. 4, 5 and 6 are curves which demonstrate the operation of the generator.

The multi-frequency generator 1 in Fig. 1 is driven by a motor 2 or other suitable means. The generator comprises, in a unitary structure, a plurality (in the example given, ten) of functionally independent units having common exciting or field coils 3. These generator units are similar each comprising in general, exciting coils 3, armature coils 4, armature laminations 5 and an inductor or rotor 6, the last three elements being individual to each such unit. The armature structures are unitarily mounted in a common frame 9, the laminations for the respective units being spaced by metallic separating members 10 sufficiently to permit the armature windings of the respective units to be mounted on the teeth 7. The inductors are similarly unitarily mounted on shaft 11 by means of a key 12. The exciting coils 3 are fixed on inwardly projecting portions of the armature laminations. Each coil embraces half of the armature coils and the supporting teeth therefor as shown in Figs. 2 and 3, the armature laminations accordingly constituting a portion of the magnetic circuit of the exciting coils 3. The complete magnetic circuit of each unit is shown in Figs. 2 and 3. The exciting coils 3 produce a steady flux from a north pole of one coil through the exciting winding core portion of the armature 5, the armature teeth 7, the air gap, the inductor teeth 8, the inductor 6 and the corresponding inductor teeth, air gap and armature teeth at the diametrically opposite side of the generator, to the opposite pole of the other exciting coil. The circuit is completed through the core of this coil and the yoke portion of the armature laminations to the south pole of the first mentioned exciting coil.

Electromagnetic forces are generated in the armature coils by the variation of flux therethrough as the inductor teeth variably affect the reluctance of the magnetic circuit through the armature teeth. Since there is no reversal of flux through the armature teeth but only a variation thereof, a complete cycle of electromotive force occurs while an inductor tooth travels through an angle equal to its tooth pitch. The frequency in cycles per second is measured by the product of the number of inductor teeth and speed of the inductor in revolutions per second.

The several generator units are preferably designed to generate currents of different frequencies. Accordingly the number of teeth is different for each inductor element. In the example illustrated, the frequency increases progressively from the end unit illustrated by Fig. 2 through the next adjacent unit illustrated by Fig. 3, and the other intermediate units to the unit at the other end of the shaft.

With a given armature tooth pitch the number of armature coils has no effect upon the frequency of the wave produced, but is a factor in determining the voltage or current of the generated wave (depending on whether the coils are connected in series or in parallel) and accordingly upon the energy output of each unit. In the usual case, it is desirable to have the armature coils occupy the whole space embraced within the exciting coils. This requires a greater number of armature teeth and coils for the units designed to generate the higher frequencies since the higher frequency requires a greater number of inductor teeth, hence a smaller inductor tooth pitch and correspondingly a smaller armature tooth pitch, to preserve the requisite relation between the pitches of the inductor and the armature teeth. However, for the case illustrated, in which the coils are connected in series, the total E. M. F. per unit may be substantially the same for all of the units, since the increase in number of armature coils is compensated by the lesser number of turns per coil which is made necessary by the smaller space available. This is on the assumption that the same size of wire is used for all of the units.

In considering the theoretical conditions of operation, each exciting coil and the group of armature coils of each generator unit embraced thereby may be conveniently considered separately as exhibiting all the characteristics of operation of the generator unit as a whole, the two identical armature groups for each unit being so connected as to cause their effects to add.

A particular commensurable relation must exist between the armature tooth pitch of each group and the corresponding inductor tooth pitch in order that the several armature coils of each group can be connected to the same circuit and add their effects. The necessary relation is satisfied if at each instant equal variations of flux are occurring in each armature tooth.

Figure 7:
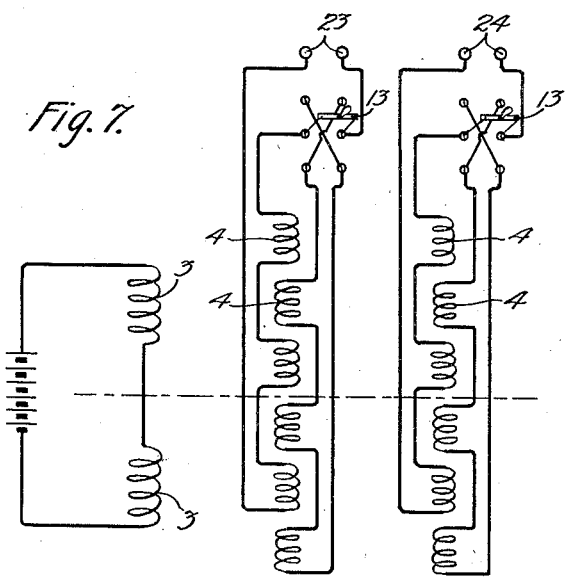
Fig. 7 is a diagrammatic representation of the electrical circuits of the generator.

This relation would be satisfied in the simplest manner by making the tooth pitch of the armature and inductor equal so as to provide a perfect symmetry of armature and inductor tooth structures. For this case, the armature coils could all be connected either in series or in parallel and in such manner that the current flows in the same relative direction in all of the coils. It is apparent that the relation may similarly be satisfied if the inductor tooth pitch is a multiple of the armature tooth pitch. In the generator illustrated symmetry of a different sort is obtained which equally satisfies the required relation. The armature tooth pitch for each group may be one and one-half times as great as the inductor tooth pitch as in the specific case illustrated, or in the general case $$\frac{2N+1}{2}$$

times as great as the inductor tooth pitch where N is any number, the larger ratios corresponding to the case of the largest number of inductor teeth per unit length. When every second armature tooth is opposed to an inductor tooth alternate armature teeth are opposed to inductor slots. At a particular instant the flux in the armature teeth opposed to inductor teeth, has been increasing in value and has just attained its maximum value. This defines the zero point of the descending portion of a positive half cycle of electromotive force. Similarly, the flux in the armature teeth opposed to inductor slots has been decreasing in value and has just attained its minimum value. This defines the zero point for the ascending portion of a negative half cycle. In other words, in alternate armature coils, with reference to the corresponding terminals, opposing E. M. F.'s are generated. The electromotive forces for the two sets of armature coils may be caused to add by connecting all of the armature coils either in series or in parallel but in such manner that the coils on alternate teeth are connected in the circuit inversely with respect to the other coils. Fig. 7 shows a method of accomplishing this for a series connection, the switch 13, for each unit, being closed in its downward position. This figure illustrates the particular case in which the alternation of positive and negative half cycles persists throughout the whole physical circuit of the armature, that is, for the armature coils corresponding to both groups. In certain of the units, as, for example, in the particular arrangements of Figs. 2 and 3, this alternation does not so persist. For these cases it will be necessary, to reverse the connection of one group with respect to that of the other group.

The particular relation of armature and inductor tooth pitch as pointed out provides an arrangement which, for the same speed of rotation and the same armature tooth pitch, gives a frequency for each unit fifty percent greater than for the case where the pitches of the two sets of teeth are equal.

A second advantage results from the fact that equal increases and decreases of flux are simultaneously occurring in different parts of each unit so that the total flux remains constant. This means that there can be no inductive effects between the several units, which otherwise might occur on account of stray fields each originating in one unit and partially completing its flux path in one or more other units. If these stray fields were variable, mutual induction effects would occur. The particular tooth pitch ratio employed accordingly makes possible the use of a common exciting circuit for a plurality of generator units wherein there is no physical separation of flux paths but between which units there is a complete functional independence.

Figure 5:
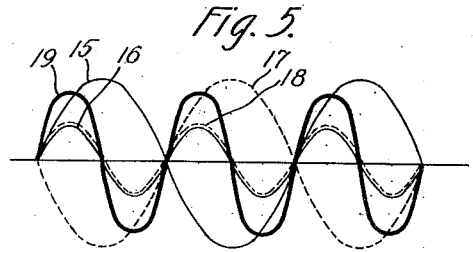
Figure 6:
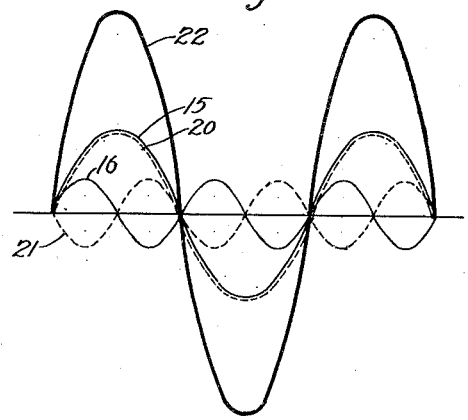

In order to understand how this particular relation of pitches of the two sets of teeth accomplishes the further function of insuring an unusually pure wave form or, in the alternative, makes possible the production of currents of either of two frequencies for each unit, reference is made to Figs. 4, 5 and 6.

Curve 14 of Fig. 4 illustrates a wave having a pronounced second harmonic, the fundamental and second harmonic components being indicated respectively by curves 15 and 16. A wave having even harmonics is characterized, as shown, by a dissymmetry between the consecutive alternations, the symmetry occurring between complete cycles rather than between alternations. With similar structure for the several poles, even harmonics cannot occur in the current generated by the usual types of generator, in which only a single alternation occurs while the rotor progresses one pole pitch. This is for the reason that the symmetry must be between alternations rather than between cycles. They may however, occur in inductor type generators, in which a complete cycle occurs in a corresponding angular movement and in which the symmetry in the generated wave may, therefore, be between alternations or between cycles as desired.

The wave form of the current generated in each armature coil, as in other dynamo electric machines, is a function of the mode of variation of the flux threading the coil, since the induced E. M. F. is a differential of the flux variation. By properly controlling the flux variations as described above there may be produced a distorted wave having a particular harmonic of large amplitude. For example, if the armature and inductor tooth widths are equal and the inductor slot width is made twice as great as this tooth width as disclosed in Figs. 1, 2 and 3, a pronounced second harmonic results. This is made readily apparent when it is considered that in the flux-time curve for this case, the flux is alternately large and small, and the time interval during which the flux is small is twice as great as the corresponding interval when it is large. The armature coil current curve derived from this flux-time curve, by taking as ordinates its changes in slope, has the shape of curve 14 of Fig. 4. A quite similar result would occur if the ratio of armature tooth width to inductor slot width is as 1 to 2 regardless of the relation of tooth widths. However, if the tooth widths are not equal the flux-time curve will tend to be more angular since there will be an interval of time during which the flux, at its maximum value will be constant. This angularity favors the production of higher order harmonics in addition to the desired second harmonic.

In Figs. 5 and 6, the distorted wave is represented only by its components. In Fig. 5, the components 15 and 16 are identically the same as in Fig. 4. The curves indicated by reference numerals 17 and 18 represent a similar distorted wave displaced 180 electrical degrees therefrom. This corresponds to the case where the armature coils are connected without reversal of alternate coils, as when switch 13 is in its upper position. This condition, as has been suggested before, results in a phase displacement of 180° between the E. M. F.'s in adjacent coils and the mutual balancing out of the fundamental component, as shown in Fig. 5. A displacement of 180° between fundamentals corresponds to a displacement of 360° between the even harmonics. Accordingly, the second harmonics in Fig. 5 are in phase and add to form curve 19. Other even harmonic components would be similarly affected. Figs. 4 and 5, therefore, illustrate how, if a purposely distorted wave contaning desired harmonics is generated, this generator can be used to generate a pure wave of a harmonic frequency.

Fig. 6, taken in connection with Fig. 4 illustrates an alternative case in which the alternate armature coils are connected reversely with respect to the other coils. This is the case which has been considered in a general way above. The curves 20 and 21 of Fig. 6 are obtained by displacing individually each of the curves 17 and 18 of Fig. 5 180 electrical degrees from its position in that figure as would result from the reversal of current. It should be noted that the effect of reversing the current is not the same as that of displacing the distorted wave 180°, as in the case of Fig. 5 when compared with Fig. 4. It is apparent that the even harmonic components are mutually balanced out but that the fundamentals add. The resultant wave is indicated by curve 22. Fig. 6, therefore, illustrates how the connection of coils which gives the largest resultant electromotive force, also eliminates the even harmonics and accordingly gives an exceptionally pure form to the resultant wave. It also illustrates how, if the purposely distorted wave of Fig. 4 is generated, the fundamental wave may be selected to the exclusion of the even harmonics. It is, therefore, possible by using the particular arrangement of armature and inductor tooth pitches described above, to obtain either one of two frequencies for each generator unit. In the multi-frequency generator of Fig. 1, in which there are ten units, twenty different frequencies may be obtained, ten of which may be used simultaneously.

By employing a second independent set of armature windings identical with that described above, it would be possible to secure all twenty frequencies simultaneously.

The arrangements above described provide means for obtaining even frequency components from a distorted wave to the exclusion of the odd frequency components (including the fundamental) or vice versa. It does not provide means for separating certain desired even frequency components from other even frequency components or odd frequency components from other odd frequency components. For example, it does not enable one to separate the fundamental and odd harmonics. This last function can be accomplished in a manner entirely analogous to that described for separating the fundamental and even harmonics by using such a ratio of tooth pitches that the E. M. F.'s in adjacent armature coils are displaced in phase a fraction of 360° which corresponds to the desired odd submultiple component. For example, the waves may be distorted in such a manner as to have a first odd harmonic. The tooth pitches would be made such that the E. M. F.'s differ by 120°. The fundamental E. M. F.'s in each group of three adjacent coils accordingly add to zero while the third harmonics add directly to produce a component having three times the amplitude of each element harmonic. By reversing one coil, an E. M. F. can be obtained which contains a strong fundamental component, although it would also contain a small amount of the harmonic. Since an inductor tooth spacing corresponds to a complete cycle the ratio of armature to inductor tooth pitch for this case must be $$\frac{3N+1}{3},$$

that is, the armature tooth pitch must be N and one-third times the inductor tooth pitch, where N may be any whole number.

It is apparent that this case is one example of a general case covering all odd harmonics in which the ratio of armature to inductor tooth pitch is $$\frac{MN+1}{M}$$

in which N is any whole number and M is the multiple of the fundamental frequency corresponding to the particular odd harmonic. This relation holds good also for the case of even harmonics although, as has been explained, all of the even harmonics are obtained in the particular case where M equals 2, as in the case first considered.

The multi-frequency generator is adapted to be used and has been used in practice in a multiplex carrier telegraph system in which so many and so closely spaced frequencies are used that extraordinary precautions must be taken to insure that they continuously maintain their initial predetermined relations. The maintenance of this relation in this system is of so much importance that if this generator were not used, resort would have had to be had to a harmonic system in which all frequencies are derived as harmonics of a base frequency produced by a single generator, a system characterized both by great cost and relatively great complexity of circuit. As shown in Fig. 7, the circuits including the armature coils are provided with terminals such as 23 or 24, to which a consumption circuit may be connected.

Although certain special embodiments of the invention have been illustrated and described, it will be readily understood by those skilled in the art that the invention may be embodied in other forms. The invention accordingly, is not to be restricted to the particular construction disclosed herein by way of example for the purpose of setting forth the invention in accordance with the patent statutes but the appended claims are intended to cover all changes in modification within the spirit and scope of the invention.

What is claimed is:

1. In combination, a plurality of rigidly connected rotatable inductor members of uniform diameter having teeth, a plurality of fixed unitarily mounted armature members having teeth in proximity to the peripheries of said inductors each having a plurality of polar members, armature coils mounted on the teeth of said armature members, and a plurality of magnetizing windings each individual to a polar member of each of said armature members.

2. An inductor generator comprising two relatively movable elements each having a plurality of uniformly spaced teeth, the ratio of the tooth pitch for one element to the tooth pitch for the other element being as MN+1 to M in which N is any number and M is the multiple of the fundamental frequency corresponding to a harmonic of the generated wave and the tooth and slot widths of said inductor being substantially different so as to generate a wave containing pronounced harmonics, and an armature coil on each tooth of the element having the larger tooth pitch.

3. An inductor generator comprising two relatively movable elements each having a plurality of uniformly spaced teeth, the ratio of the tooth pitch for one element to the tooth pitch for the other element being as 3 to 2, and the slot widths of the element having the smaller tooth pitch being twice the corresponding tooth widths, and an armature coil on each tooth of the element having the larger tooth pitch.

4. An inductor generator comprising two relatively movable elements each having a plurality of uniformly spaced teeth, the ratio of the tooth pitch for an element to the tooth pitch for the other element being as 3 to 2, an armature coil on each tooth of the element having the larger tooth pitch, means connecting said armature coils in two distinct groups of alternate coils, the coils being similarly related in each group, and switching means for connecting said groups in either aiding or opposing relation.

5. A multi-frequency inductor generator comprising a plurality of axially arranged groups of stator laminations, each group having a plurality of inwardly extending polar members, each polar member having a plurality of inwardly extending teeth, a plurality of magnetizing windings for said groups each said winding being individual to a polar member of each of said groups, an armature coil on each tooth, a plurality of integrally mounted groups of toothed inductor laminations arranged coaxially with said stator laminations and having their teeth closely adjacent to the teeth of said groups of stator laminations, the tooth pitch of the teeth in each inductor group to the tooth pitch of the teeth in the corresponding stator group being in the ratio of 3 to 2.

6. An inductor generator according to claim 3 wherein the respective teeth are proportioned so as to give a pronounced even harmonic, and means for alternatively connecting groups comprising alternate armature coils in either aiding or opposing relation.

7. In combination, means for producing a wave having a pronounced first even harmonic, means for producing a similar wave displaced in phase therefrom 180 electrical degrees, and switching means for alternatively combining said waves in aiding or opposing relation.

8. An inductor generator according to claim 3 wherein the respective teeth are proportioned so as to give pronounced even harmonics, and means for connecting groups comprising alternate armature coils in opposing relation, so that the even harmonics are eliminated and the fundamental is accentuated.

9. A multi-frequency generator comprising a plurality of integrally related generator units each comprising a toothed armature member, a toothed inductor member mounted in relatively movable relation thereto, and an armature winding on the teeth of the armature member, the yoke portions of the armature members of the various units being magnetically in common and the relation of armature tooth pitch to inductor tooth pitch for each unit being according to the ratio $$\frac{2N+1}{2}$$

where N is any integral number.

10. An inductor generator according to claim 3 wherein the armature and inductor teeth widths are substantially equal and the ratio of tooth width to inductor slot width is as 1 to 2.

In witness whereof, I hereunto subscribe my name this 6th day of June, A. D. 1923.

HUGH M. STOLLER.